(No Model.)

T. NUGENT.
HOT AIR FURNACE.

No. 311,845. Patented Feb. 3, 1885.

WITNESSES:
William Miller
Otto Hufeland

INVENTOR
Thomas Nugent.
BY Van Santvoord & Hauff
ATTORNEYS

UNITED STATES PATENT OFFICE.

THOMAS NUGENT, OF NEW YORK, N. Y.

HOT-AIR FURNACE.

SPECIFICATION forming part of Letters Patent No. 311,845, dated February 3, 1885.

Application filed June 5, 1884. (No model.)

*To all whom it may concern:*

Be it known that I, THOMAS NUGENT, a subject of the Queen of Great Britain, residing at New York, in the county and State of New York, have invented new and useful Improvements in Hot-Air Furnaces, of which the following is a specification.

This invention relates to furnaces for generating hot air, to be used especially for warming buildings; and it consists in certain novel features of construction, whereby various important advantages are gained, as hereinafter fully described, the whole being illustrated in the accompanying drawings, in which—

Figure 1:
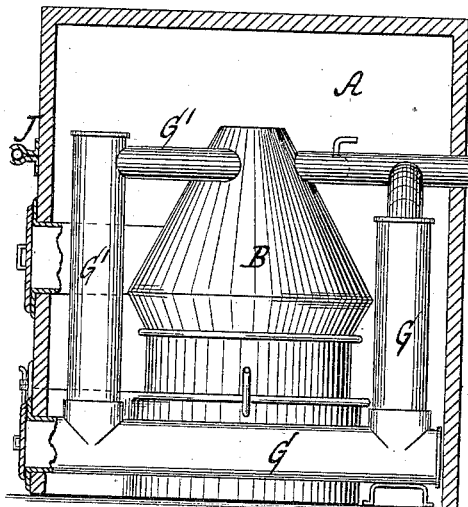
Figure 2:
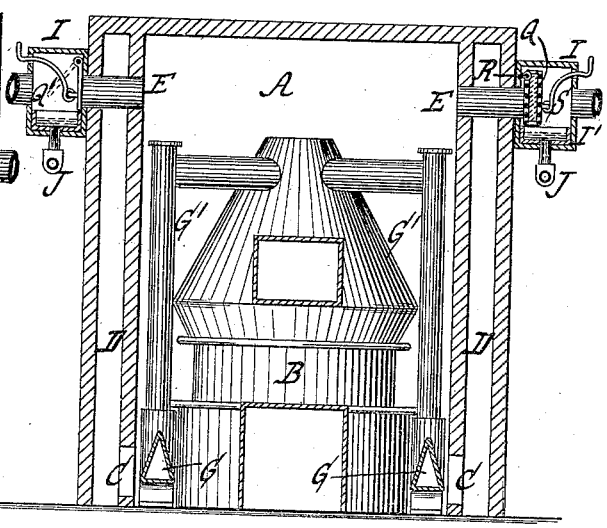
Figure 3:
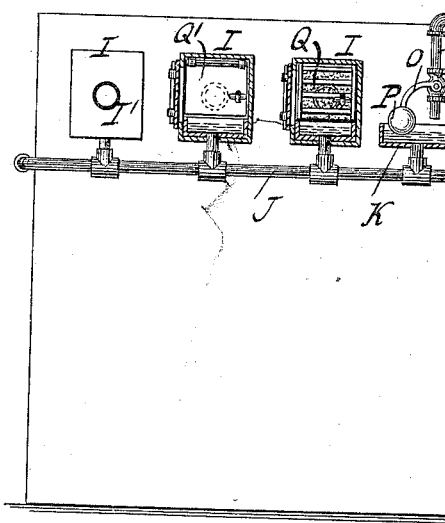
Figure 4:
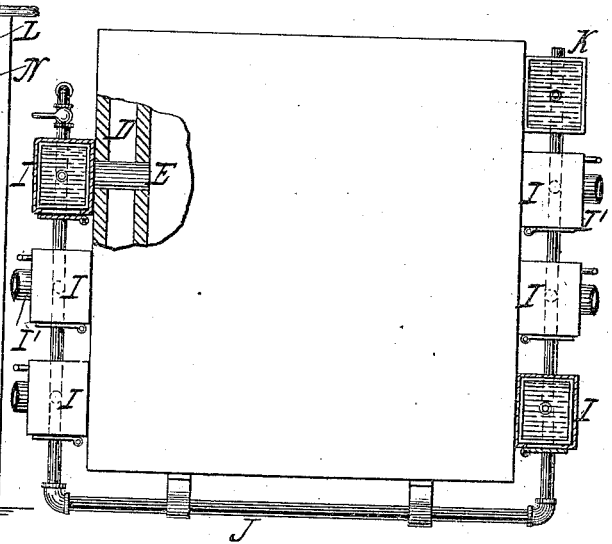

Figure 1 is a vertical section. Fig. 2 is a like section taken at a right angle to Fig. 1. Fig. 3 is a side view, partly in section. Fig. 4 is a plan or top view.

Similar letters indicate corresponding parts.

The letter A designates a hot-air chamber, in which is arranged the furnace B, and into which cold air enters at or near the bottom through inlet-openings C, communicating with air-spaces D in the walls of the chambers, while the hot air escapes therefrom at or near the top through outlet-flues E. The furnace embodies in its structure horizontal smoke-pipes G, which are arranged at the base of the hot-air chamber and communicate with the fire-pot by the vertical pipes G' and horizontal pipes leading into the top of the fire-box, so that the volatile products of combustion may be conducted through the horizontal pipes for the purpose of utilizing the heat of such products. The cross-section of the horizontal pipes G is that of an isosceles triangle, one side thereof being smaller than either of the other two sides, and being at the base of the pipes, and by this construction of the pipes the greatest possible radiation of heat therefrom is obtained in an upward direction, which is the direction in which the air circulates through the chamber.

To the hot-air chamber A are connected, by means of the outlet-flues E, vapor-chambers I, which in practice are supplied with water, so that the air escaping from the hot-air chamber circulates through these vapor-chambers and is charged with aqueous vapor, in which condition it may be supplied to a building through outlet-flues I' of the chambers.

To the vapor-chambers I is connected, by means of a pipe, J, a water-supply tank, K, into which water is drawn through a feed-pipe, L, having a stop-cock, N, to which is connected, by means of a lever, O, a float, P, which is arranged in the water-supply tank in such a manner that the stop-cock is automatically opened and closed by the action of the float, and the water in the tank, together with the vapor-chambers, is always kept at a fixed level. The bottom of the water-supply tank K is substantially in the horizontal plane of the bottom of the vapor-chambers I, and by this arrangement the same depth, as well as the same level, of water is maintained in the tank and the chambers; but the bottom of the tank may also be below that of the chambers, the depth of the tank being comparatively increased.

In the vapor-chambers I, respectively, is arranged a screen, Q, of wool or other similar material, through which the air escaping from the hot-air chamber percolates, so as to become filtered of dust or other impurities. The position of the screen Q is opposite to the inlet-orifice of the vapor-chambers I, where it is supported by hinge-joints R, and to the screen is connected a strap, S, or other similar device, for adjusting it in relation to the inlet-orifice, so that when desirable the orifice may be laid bare to permit an uninterrupted flow of air. The wool or other material composing the screen Q is supported between two layers of wire-cloth or other similar material.

It is evident that a single vapor-chamber may be used in lieu of a series of such chambers, the purpose of the series being essentially to increase the capacity of the apparatus; and, if desirable, a plain gate may be substituted for the filtering-screens Q, as shown at Q', Figs. 2 and 3.

I am aware of the existence of a hot-air furnace in which a fire-box inclosed in a hot-air chamber is surmounted by a radiator-drum having vertical tubes which extend sidewise from said radiator in a downward direction to horizontal drums made of a round or oval shape, and arranged at the side of the fire-box in a longitudinal direction.

I disclaim the foregoing construction, and confine myself to the triangular shape of the bottom horizontal tubes and their connection with the top of the fire-box by vertical and horizontal tubes, whereby I combine simplicity of construction with a maximum degree of heat-radiating properties possessed by such bottom horizontal tubes, as has already been set forth.

What I claim as new, and desire to secure by Letters Patent, is—

1. In a hot-air furnace, the combination of the hot-air chamber having bottom inlet and upper outlet openings, the fire-pot inclosed in said chamber, the bottom horizontal smoke-pipes made triangular in cross-section, and the vertical and horizontal pipes for connecting said triangular smoke-pipes with the top of the fire-pot, substantially as described.

2. In a hot-air furnace, the combination, with the hot-air chamber and the fire-pot inclosed therein, of the exterior vaporizing-chamber, the water-supply tank, the feed-pipe, cock, and float, and the pipe leading from the hot-air chamber to the vaporizing-chamber, having a screen, valve, or gate, substantially as described.

3. The combination, substantially as hereinbefore described, with the hot-air chamber, of a vapor-chamber connected to the hot-air chamber, a screen of wool or other similar material arranged in the vapor-chamber opposite to its inlet-orifice on hinge joints, and a strap or other similar device connected to the screen for adjusting it in relation to the inlet-orifice.

In testimony whereof I have hereunto set my hand and seal in the presence of two subscribing witnesses.

THOMAS NUGENT. [L. S]

Witnesses:
W. HAUFF,
CHAS. WAHLERS.